United States Patent
Akamine et al.

(10) Patent No.: US 8,912,116 B2
(45) Date of Patent: Dec. 16, 2014

(54) EXHAUST GAS PURIFICATION CATALYST

(75) Inventors: Masaaki Akamine, Hiroshima (JP); Hideharu Iwakuni, Higashi-Hiroshima (JP); Hisaya Kawabata, Hiroshima (JP); Yasuhiro Ochi, Hiroshima (JP); Yuki Murakami, Hiroshima (JP); Susumu Mineoi, Aki-gun (JP); Akihide Takami, Hiroshima (JP); Masahiko Shigetsu, Higashi-Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 1175 days.

(21) Appl. No.: 12/846,486

(22) Filed: Jul. 29, 2010

(65) Prior Publication Data
US 2011/0045968 A1 Feb. 24, 2011

(30) Foreign Application Priority Data

Aug. 18, 2009 (JP) ................. 2009-189182
Mar. 25, 2010 (JP) ................. 2010-070930

(51) Int. Cl.
*B01J 23/10* (2006.01)
*B01D 53/94* (2006.01)
(Continued)

(52) U.S. Cl.
CPC .............. *B01J 23/63* (2013.01); *B01J 37/0248* (2013.01); *B01D 53/945* (2013.01); *B01D 2258/014* (2013.01); *B01J 23/002* (2013.01); *B01D 2255/2061* (2013.01); *B01D 2255/407* (2013.01); *B01J 37/0244* (2013.01); *B01D 2255/2068* (2013.01); *B01J 37/0036* (2013.01); *B01J 35/002* (2013.01); *Y02T 10/22* (2013.01); *B01D 2255/1025* (2013.01); *B01J 35/023* (2013.01); *B01J 35/0013* (2013.01); *B01D 2255/9022* (2013.01); *B01J 35/0006* (2013.01); *B01D 2255/9202* (2013.01); *B01J 2523/00* (2013.01)
USPC ............ 502/304; 502/349; 502/302; 502/303

(58) Field of Classification Search
USPC ......................................... 502/302–304, 349
See application file for complete search history.

(56) References Cited

U.S. PATENT DOCUMENTS

| 2005/0119120 A1 | 6/2005 | Iwakuni et al. |
| 2006/0276331 A1 | 12/2006 | Akamine et al. |

FOREIGN PATENT DOCUMENTS

| EP | 1 952 876 A1 | 8/2008 |
| EP | 2 055 366 A1 | 5/2009 |

(Continued)

OTHER PUBLICATIONS

The Extended European Search Report dated Oct. 21, 2010; Application No. 10168494.2-2104.

*Primary Examiner* — Kaj K Olsen
*Assistant Examiner* — Pritesh Darji
(74) *Attorney, Agent, or Firm* — Studebaker & Brackett PC

(57) ABSTRACT

A catalyst layer includes: a first mixed oxide particle component 4 which contains Ce and Rh 8 and in which Rh is partially exposed at particle surfaces; and a second mixed oxide particle component 5 containing Ce, Zr, and a rare earth metal except Ce. The particle size distribution of the first mixed oxide particle component 4 has a peak in the particle size range from 100 nm to 300 nm, both inclusive. The particle size distribution of the second mixed oxide particle component 5 has a peak in a particle size range larger than the particle size range in which the first mixed oxide particle component 4 has the peak. At least part of particles of the first mixed oxide particle component 4 is attached to at least part of particles of the second mixed oxide particle component 5.

20 Claims, 3 Drawing Sheets

(51) Int. Cl.
*B01J 23/00* (2006.01)
*B01J 37/00* (2006.01)
*B01J 23/63* (2006.01)
*B01J 35/02* (2006.01)
*B01J 37/02* (2006.01)
*B01J 35/00* (2006.01)

(56) References Cited

FOREIGN PATENT DOCUMENTS

| | | |
|---|---|---|
| JP | 2007-031192 A | 2/2007 |
| JP | 2008-62130 A | 3/2008 |
| WO | 2010/101223 A1 | 9/2010 |

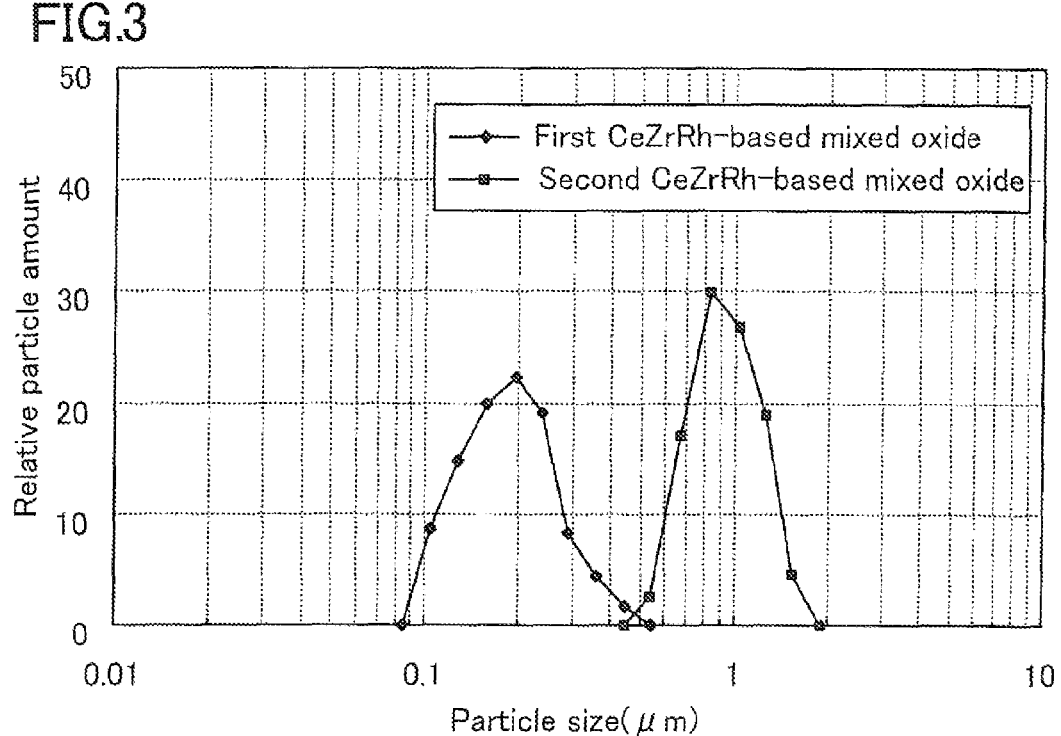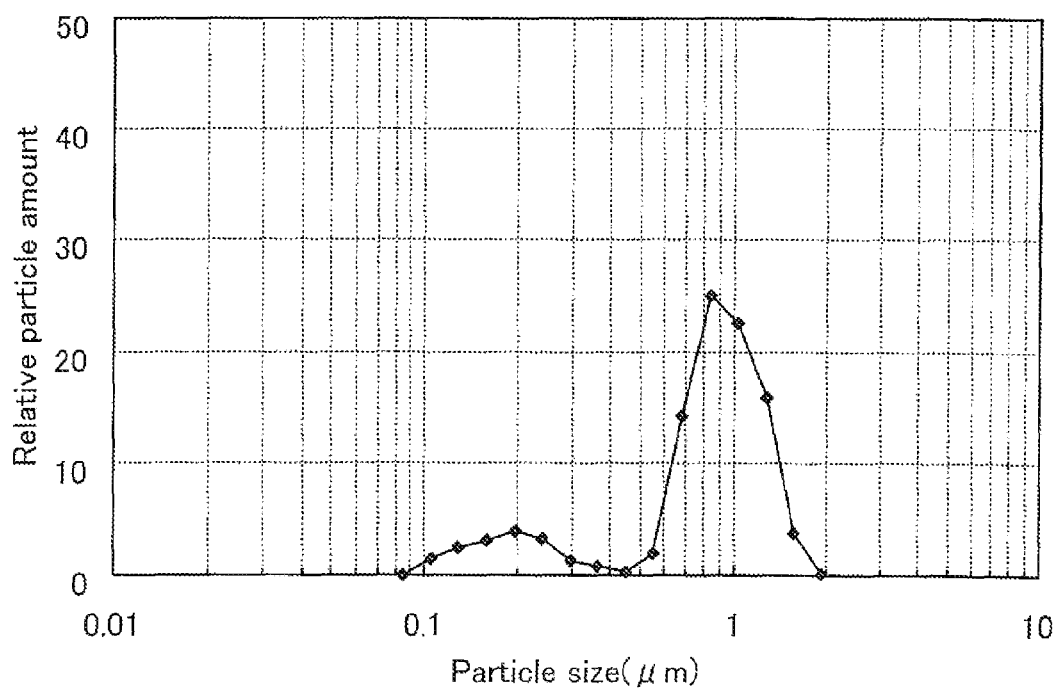

EXHAUST GAS PURIFICATION CATALYST

CROSS-REFERENCE TO RELATED APPLICATION

This application claims priority to Japanese Patent Application No. 2009-189182 filed on Aug. 18, 2009 and Japanese Patent Application No. 2010-070930 filed on Mar. 25, 2010, the disclosure of which including the specifications, the drawings, and the claims is hereby incorporated by reference in their entireties.

BACKGROUND

The present invention relates to exhaust gas purification catalysts.

Conventional exhaust gas purification catalysts have a problem in which agglomeration of catalytic metal particles degrades the performance of the catalysts. The agglomeration of catalytic metal particles occurs when a catalyst is exposed to high-temperature exhaust gas. For example, the temperature of an exhaust gas purification catalyst directly coupled to an exhaust manifold of an automobile engine reaches as high as about 1100° C. in some cases. Even if dispersed catalytic metal particles are carried on a support member having a large specific surface area, such as activated alumina, these catalytic metal particles inevitably gradually agglomerate. Conventional catalysts include a relatively large amount of catalytic metal in order to obtain a certain level of catalytic performance even with agglomeration of the catalytic metal. However, precious metals, such as Pt, Pd, and Rh, which are generally employed as catalytic metals are expensive, and resources of such rare metals have been sought in recent years.

To solve the foregoing problem, catalytic metal is not only carried on the surface of, for example, activated alumina, but also dissolved in a CeZr-based mixed oxide (composite oxide) serving as an oxygen storage/release material which stores and releases oxygen according to a variation of the air-fuel ratio of exhaust gas. When catalytic metal is dissolved in this CeZr-based mixed oxide, the oxygen storage/release capacity of the CeZr-based mixed oxide is greatly increased. Accordingly, if the CeZr-based mixed oxide in which catalytic metal is dissolved is used as a three-way catalyst and the air-fuel ratio of exhaust gas is repeatedly changed between lean and rich with respect to the stoichiometric air-fuel ratio, excellent exhaust-gas-purification performance can be obtained even with a small amount of the catalytic metal.

For example, Japanese Patent Publication No. 2005-161143 shows that a precious metal catalyst is placed between atoms, at crystal lattice points, and/or at oxygen defect sites of a CeZr-based mixed oxide, and is carried on the surface of the CeZr-based mixed oxide. Japanese Patent Publication No. 2006-334490 shows that CeZr-based mixed oxide particles containing catalytic metal is carried on the surfaces of CeZr-based mixed oxide particles containing no catalytic metal, and that in the CeZr-based mixed oxide particles containing catalytic metal, the catalytic metal is placed at least one of at and between crystal lattice points of the CeZr-based mixed oxide and is partially exposed at the surfaces of the CeZr-based mixed oxide particles. The technique of Japanese Patent Publication No. 2007-31192 is directed to a ceria-zirconia solid solution sol for cleaning an automobile exhaust gas, and shows that the ceria-zirconia solid solution sol has an average particle diameter of 5 to 100 nm

SUMMARY

The above-mentioned CeZr-based mixed oxide (composite oxide) powder in which catalytic metal is dissolved can be obtained by a coprecipitation process in which a basic solution is added to, and mixed with, an acid solution containing ions of Ce, Zr, and catalytic metal, and the resultant precipitate is dried and calcined. In general, each particle of the CeZr-based mixed oxide powder is made of a large number of agglomerated primary particles each having a size of about 5 nm to about 20 nm and formed in the drying and calcination processes, i.e., is made of a secondary particle (agglomerated particles), and has an average size of about 500 nm to about 1000 nm.

In the CeZr-based mixed oxide particles, catalytic metal constitutes the primary particles together with Ce and Zr, and is partially exposed at the surfaces of the primary particles. However, the entire part of the catalytic metal exposed at the surface of each primary particle is not necessarily effective for exhaust gas purification.

Specifically, in CeZr-based mixed oxide particles (i.e., secondary particles) each made of an agglomeration of a large number of primary particles, catalytic metal of internal primary particles is less likely to be in contact with exhaust gas than catalytic metal of primary particles exposed at the surfaces of secondary particles. Catalytic metal in the interfaces between the primary particles is not in contact with exhaust gas. Accordingly, catalytic metal at the surfaces of interior primary particles is not effective for exhaust gas purification, as compared to catalytic metal at the surfaces of primary particles located at the surfaces of secondary particles which easily come into contact with exhaust gas. For this reason, there have been limitations in improving exhaust gas purification capacity by dissolving catalytic metal in the CeZr-based mixed oxide.

To overcome the foregoing problem, according to the present invention, a mixed oxide powder containing Ce and catalytic metal can be more effectively used for purification of exhaust gas.

The inventors of the present invention found that exhaust gas purification performance can be improved by adjusting the size of particles of a mixed oxide containing Ce and catalytic metal (i.e., an oxide containing ions of Ce and catalytic metal), to arrive at the invention. Specific description will be given below.

In an aspect of the present invention, an exhaust gas purification catalyst includes a support and a catalyst layer provided on the support. In the exhaust gas purification catalyst, the catalyst layer includes a plurality of types of mixed oxide particle components containing Ce, the plurality of types of mixed oxide particle components include a first mixed oxide particle component containing Ce and a catalytic metal which is partially exposed at particle surfaces, and a second mixed oxide particle component containing Ce, Zr, and a rare earth metal except Ce, a particle size distribution of the first mixed oxide particle component has a peak in the particle size range from 100 nm to 300 nm, both inclusive, a particle size distribution of the second mixed oxide particle component has a peak in a particle size range larger than the particle size range in which the first mixed oxide particle component has the peak, and at least part of particles of the first mixed oxide particle component is attached to at least part of particles of the second mixed oxide particle component.

The average particle size of CeZr-based mixed oxide particles containing catalytic metal and described in Japanese Patent Publication No. 2006-334490 is estimated at about 500 nm to about 1000 nm. On the other hand, according to the present invention, the particle size distribution of the first mixed oxide particle component has a peak in the particle size range from 100 nm to 300 nm, both inclusive. In this regard, the first mixed oxide particle component of the present invention differs from the CeZr-based mixed oxide particles containing catalytic metal and described in Japanese Patent Publication No. 2006-334490.

The feature in which the particle size distribution of the first mixed oxide particle component has a peak in the particle size range from 100 nm to 300 nm, both inclusive, means that the particle size of the first mixed oxide particle component is considerably small, and therefore, the specific surface area thereof is large. Accordingly, the first mixed oxide particle component has excellent oxygen storage/release capacity. In addition, the feature of a small particle size means that a large amount of catalytic metal is exposed at the particle surfaces. Thus, the oxygen storage/release capacity of the first mixed oxide particle component can be further improved, and the activity of the catalyst can be increased.

With conventional techniques, as the size of particles decreases, the particles more easily agglomerate so that an exhaust gas purification catalyst more greatly degrades when exposed to high-temperature exhaust gas. In contrast, according to the present invention, at least part of particles of the first mixed oxide particle component is attached to at least part of particles of the second mixed oxide particle component having a large particle size. This structure can reduce agglomeration of the first mixed oxide particle component. In addition, the attachment causes catalytic metal of the first mixed oxide particles having a small particle size to be dispersed on the surfaces of the second mixed oxide particles, thereby advantageously enhancing oxygen storage/release capacity and catalyst activity.

In this manner, according to the present invention, the first mixed oxide particle component having a small particle size in which a large amount of catalytic metal is exposed at the particle surfaces can be utilized to efficiently enhance exhaust gas purification performance.

Examples of the catalytic metal described above include Pd, Pt, Rh, In, Au, and Ag. With respect to the second mixed oxide particle component, examples of the above-mentioned rare earth metal except Ce include Y, Nd, Pr, and La.

In a preferred embodiment of the present invention, the particle size distribution of the second mixed oxide particle component has a peak in the particle size range from 550 nm to 1200 nm, both inclusive.

In a preferred embodiment of the present invention, the second mixed oxide particle component contains the catalytic metal in addition to Ce, Zr, and the rare earth metal except Ce, and the catalytic metal in the second mixed oxide particle component is partially exposed at particle surfaces. Then, oxygen storage/release capacity and catalyst activity can be more effectively enhanced.

The first mixed oxide particle component may contain, in addition to Ce and the catalytic metal, either Zr or a rare earth metal except Ce. Alternatively, as the second mixed oxide particle component does, the first mixed oxide particle component may contain Ce, Zr, the catalytic metal, and a rare earth metal except Ce. In this case, the first mixed oxide particle component and the second mixed oxide particle component may, or may not, have the same composition. Further, another metal component except Ce, Zr, and the catalytic metal may be added when necessary, and different metal components may be respectively added to the first mixed oxide particle component and the second mixed oxide particle component.

Each of the first mixed oxide particle component and the second mixed oxide particle component is preferably a $ZrO_2$-rich mixed oxide powder (i.e., where the amount of $ZrO_2$ is larger than that of $CeO_2$). The metal component except Ce, Zr, and the catalytic metal is preferably Nd. In this case, the composition (mass ratio) of the component except the catalytic metal is preferably $CeO_2:ZrO_2:Nd_2O_3=(5-25):(55-85):(5-20)$. The dissolution concentration of the catalytic metal is preferably in the range from 0.01% to 20%, by mass, both inclusive. Examples of the metal component except Nd include Pr, Y, La, Hf, Ba, Sr, Ca, K, and Mg.

The catalyst layer on the support may be made of a single layer or a plurality of stacked layers. In a stacked-layer structure, the first mixed oxide particle component and the second mixed oxide particle component are located in an upper layer in the case of employing Rh as a catalytic metal, whereas the first mixed oxide particle component and the second mixed oxide particle component are located in a lower layer in the case of employing Pd as a catalytic metal. In the case of employing Pt as a catalytic metal, the first mixed oxide particle component and the second mixed oxide particle component are preferably provided in one of, or each of, the upper and lower layers.

In a preferred embodiment of the present invention, a particle size distribution of the first mixed oxide particle component has a peak in the particle size range from 100 nm to 300 nm, both inclusive, and a concentration of a catalytic metal X in surfaces of at least part of particles in this particle size range is in the range from 0.07 atomic percent to 0.09 atomic percent, both inclusive, when measured by X-ray photoelectron spectroscopy. This first mixed oxide particle component can obtain high oxygen storage capacity and high catalyst activity.

In a preferred embodiment of the present invention, a particle size distribution of the second mixed oxide particle component has a peak in the particle size range from 550 nm to 1200 nm, both inclusive, and a concentration of a catalytic metal X in surfaces of at least part of particles in this particle size range is in the range from 0.04 atomic percent to 0.06 atomic percent, both inclusive, when measured by X-ray photoelectron spectroscopy. This structure is advantageous in enhancing exhaust gas purification performance by causing at least part of particles of the first mixed oxide particle component to be carried on (attached to) at least part of particles of the second mixed oxide particle component.

In a preferred embodiment of the present invention, the number of particles of the first mixed oxide particle component is smaller than that of the second mixed oxide particle component. Specifically, the number of particles of the first mixed oxide particle component which can be carried on (attached to) particles of the second mixed oxide particle component has a limitation. Thus, when the number of particles of the first mixed oxide particle component becomes excessive, these particles easily agglomerates, and oxygen storage/release capacity and exhaust gas purification deteriorate. Therefore, the number of particles of the first mixed oxide particle component is preferably smaller than that of the second mixed oxide particle component.

In a preferred embodiment of the present invention, the catalyst layer includes a lower catalyst layer provided on the support and an upper catalyst layer provided on top of, or above, the lower catalyst layer, and the first mixed oxide particle component and the second mixed oxide particle component are included in the upper catalyst layer.

In a preferred embodiment of the present invention, the catalyst layer includes ZrLa-alumina particles in which a ZrLa mixed oxide containing Zr and La is carried on activated alumina particles, and part of particles of the first mixed oxide particle component is attached to the ZrLa-alumina particles.

In a preferred embodiment of the present invention, the first mixed oxide particle component constitutes at least part of a binder in the catalyst layer.

In another aspect of the present invention, an exhaust gas purification catalyst includes a support and a catalyst layer provided on the support. In the exhaust gas purification catalyst, the catalyst layer includes a CeZrX-based mixed oxide powder in which a catalytic metal X is dissolved and partially exposed at particle surfaces. A particle size distribution of the CeZrX-based mixed oxide powder included in the catalyst layer has two peaks, the amount of catalytic metal X exposed at particle surfaces in the first particle group having a small particle size relative to the valley between these peaks, is larger than that of the second particle group having a large particle size relative to the valley, when compared to each other per a unit mass. In addition, at least part of CeZrX-based mixed oxide particles of the first particle group is carried on CeZrX-based mixed oxide particles of the second particle group.

The amount of the catalytic metal X exposed at the particle surfaces in the CeZrX-based mixed oxide powder of the small-size first particle group is larger than that of the large-size second particle group, when compared to each other per a unit mass, and thus, the oxygen storage/release capacity and the catalyst activity of the first particle group are higher than those of the second particle group. In addition, the small particle size of the CeZrX-based mixed oxide particles means a large specific surface area thereof. This relationship also contributes to the fact that the oxygen storage/release capacity of the small-size first particle group is higher than that of the large-size second particle group. However, since the first particle group has a small particle size, particles of the first particle group easily agglomerate, and thus, the exhaust gas purification catalyst more greatly deteriorates when exposed to high-temperature exhaust gas.

To solve this problem, at least part of the CeZrX-based mixed oxide particles of the small-size first particle group is carried on CeZrX-based mixed oxide particles of the large-size second particle group. Then, agglomeration of the small-size CeZrX-based mixed oxide particles can be reduced, and the concentration of the catalytic metal X in the surfaces of the large-size CeZrX-based mixed oxide particles can be increased, thereby advantageously increasing oxygen storage/release capacity and catalyst activity. Specifically, small-size CeZrX-based mixed oxide particles having a large proportion of the catalytic metal X exposed at particle surfaces can be utilized to efficiently enhance exhaust gas purification performance.

The CeZrX-based mixed oxide powders of the first and second particle groups do not need to have the same composition as long as the catalytic metal X is dissolved in a CeZr-based mixed oxide and partially exposed at the particle surfaces. Another metal component except Ce, Zr, and the catalytic metal X may be added when necessary, and different metal components may be respectively added to the CeZrX-based mixed oxide powders of the first and second particle groups.

The first particle group corresponds to the first mixed oxide particle component, and the second particle group corresponds to the second mixed oxide particle component. The first particle group and the second particle group may have respectively similar compositions to those of the first mixed oxide particle component and the second mixed oxide particle component.

In another aspect of the present invention, an exhaust gas purification catalyst includes a support and a catalyst layer provided on the support. In this exhaust gas purification catalyst, the catalyst layer includes CeZrX-based mixed oxide powder in which a catalytic metal X is dissolved and partially exposed at particle surfaces. The CeZrX-based mixed oxide powder contains a group of particles having a particle size in the range from 100 nm to 300 nm, both inclusive. A concentration of the catalytic metal X in the particle surfaces is in the range from 0.07 atomic percent to 0.09 atomic percent, both inclusive, when measured by X-ray photoelectron spectroscopy.

Since the small-size CeZrX-based mixed oxide powder having a high concentration of the catalytic metal X in the particle surfaces is included in the catalyst layer, high exhaust gas purification performance can be obtained.

In another aspect of the present invention, a method for producing an exhaust gas purification catalyst including a support and a catalyst layer provided on the support where the catalyst layer includes CeZrX-based mixed oxide powder in which a catalytic metal X is dissolved and partially exposed at particle surfaces, includes: the power preparation step of preparing a first CeZrX-based mixed oxide powder and a second CeZrX-based mixed oxide powder having different peak particle sizes in particle size distribution; and the step of forming a catalyst layer by mixing the first and second CeZrX-based mixed oxide powders and wash-coating the support with these powders. In the powder preparation step, the first CeZrX-based mixed oxide powder is obtained by grinding a CeZrX-based mixed oxide powder so as to reduce the particle size of the CeZrX-based mixed oxide powder, and the second CeZrX-based mixed oxide powder is the CeZrX-based mixed oxide powder having a large particle size before the grinding. In the step of forming the catalyst layer, the first and second CeZrX-based mixed oxide powders are mixed so that the particle size distribution of the resultant mixture has two peaks.

Specifically, in the case of a CeZrX-based mixed oxide powder (i.e., secondary particles), particles having larger sizes include a larger amount of primary particles buried in the particles. When this CeZrX-based mixed oxide powder (i.e., secondary particles) is ground to reduce the particle size, this grinding causes primary particles which were buried in the secondary particles before the grinding to be exposed at the surfaces, and the proportion of primary particles at the surfaces of the secondary particles increases accordingly. Since the catalytic metal X is exposed at the surfaces of primary particles, an increase in the proportion of primary particles at the surfaces of secondary particles through the grinding increases the proportion of the catalytic metal X exposed at the surfaces of the secondary particles.

That is, the amount of the catalytic metal X exposed at the particle surfaces of the first CeZrX-based mixed oxide powder having a small size of secondary particles after grinding is larger than that of the second CeZrX-based mixed oxide powder having a large size of secondary particles before grinding, when compared to each other per a unit mass.

The first CeZrX-based mixed oxide powder having a small peak particle size and the second CeZrX-based mixed oxide powder having a large peak particle size which are obtained by the grinding are mixed together to have a particle size distribution with two peaks, and a support is wash-coated with this mixture. Then, small-size CeZrX-based mixed oxide particles are partially carried on large-size CeZrX-based mixed oxide particles.

Accordingly, with the method of the present invention, the resultant exhaust gas purification catalyst has the following structure. Specifically, the particle size distribution of the CeZrX-based mixed oxide powder included in the catalyst layer on the support has two peaks. In addition, the amount of the catalytic metal X exposed at particle surfaces of the first particle group having a small particle size relative to a valley between these peaks is larger than that of the second particle group having a large particle size relative to the valley, when compared to each other per a unit mass. Further, at least part of CeZrX-based mixed oxide particles of the first particle group is carried on CeZrX-based mixed oxide particles of the second particle group.

Preferably, to obtain the first CeZrX-based mixed oxide powder, wet grinding is employed, a sol of the resultant first CeZrX-based mixed oxide powder and the second CeZrX-based mixed oxide powder are mixed, and the support is wash-coated with these powders, thereby forming a catalyst layer.

BRIEF DESCRIPTION OF THE DRAWINGS

FIG. 3 is a graph showing particle size distributions of a first CeZrRh-based mixed oxide powder and a second CeZrRh-based mixed oxide powder.

FIG. 4 is a graph showing a particle size distribution of a CeZrRh-based mixed oxide powder according to Example 1.

DETAILED DESCRIPTION

Hereinafter, preferred embodiments of the invention will be described with reference to the drawings. Note that the following description of the preferred embodiments is merely illustrative in nature, and is not intended to limit the scope, applications, and use of the invention.

Embodiment 1

Figure 1:
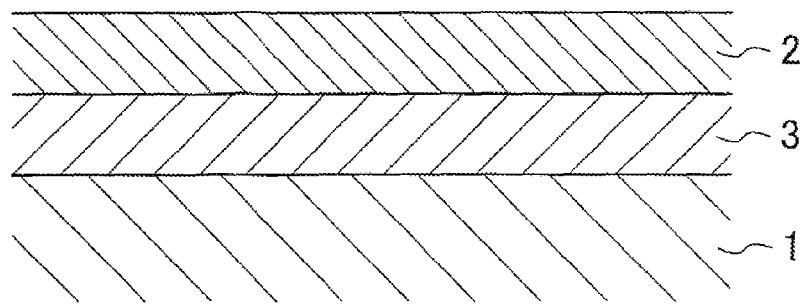
FIG. 1 is a cross-sectional view schematically illustrating an example of an exhaust gas purification catalyst according to the present invention.

In an exhaust gas purification catalyst illustrated in FIG. 1, reference numeral 1 denotes a support. An upper catalyst layer 2 and a lower catalyst layer 3 are stacked on the support 1. This exhaust gas purification catalyst is suitable for use as a three-way catalyst for simultaneously purifying HC (hydrocarbon), CO, and NOx (nitrogen oxide) contained in exhaust gas produced when a gasoline engine of an automobile is driven around the stoichiometric air-fuel ratio.

The support 1 is, for example, a honeycomb support made of cordierite. Each of the upper catalyst layer 2 and the lower catalyst layer 3 contains a catalytic metal and an oxygen storage/release material. In this embodiment, the upper catalyst layer 2 contains, as the oxygen storage/release material, a CeZrRh-based mixed oxide powder in which Rh as a catalytic metal X is dissolved and partially exposed at the surfaces of particles. In the following description, a mixed oxide in which Rh is dissolved and partially exposed at the surfaces of particles will be referred to as a "Rh-doped mixed oxide" as necessary. The CeZrRh-based mixed oxide powder may be provided not only in the upper catalyst layer 2, but also in the lower catalyst layer 3.

Figure 2:
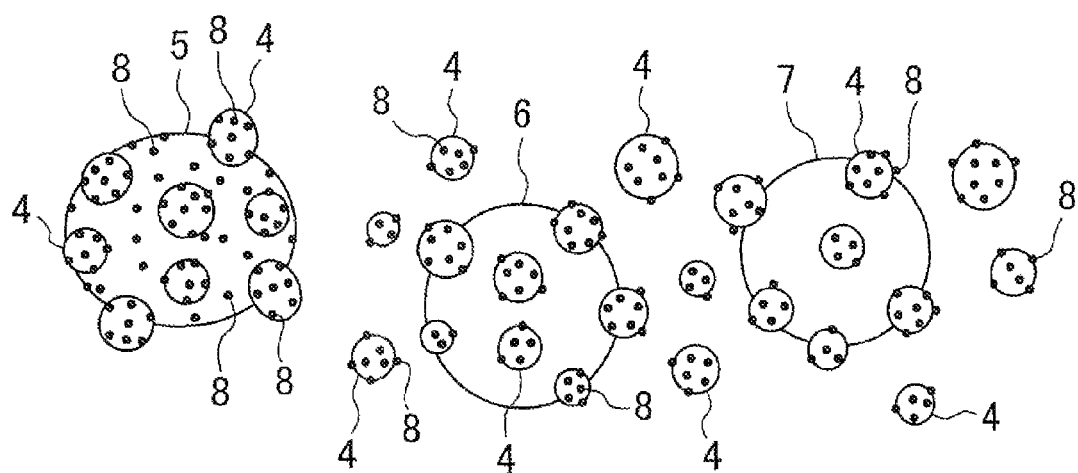
FIG. 2 is a cross-sectional view schematically illustrating the state of various particles included in a catalyst layer of the catalyst.

FIG. 2 schematically illustrates the state of catalyst components in the upper catalyst layer 2. The CeZrRh-based mixed oxide powder includes CeZrRh-based mixed oxide particles (a first mixed oxide particle component) 4 which belong to a first particle group having a small particle size and CeZrRh-based mixed oxide particles (a second mixed oxide particle component) 5 which belong to a second particle group having a large particle size. The upper catalyst layer further includes: powder of Rh/ZrLa-alumina particles 6 in which Rh is carried on activated alumina carrying a ZrLa mixed oxide; and powder of La-containing activated alumina particles 7. The element Rh 8 is exposed at the surfaces of the CeZrRh-based mixed oxide particles 4 of the small-size first particle group and the surfaces of the CeZrRh-based mixed oxide particles 5 of the large-size second particle group. The Rh particles carried on the ZrLa-alumina particles 6 are not shown in the drawing.

The CeZrRh-based mixed oxide particles 4 of the small-size first particle group are substantially uniformly dispersed in the upper catalyst layer, and part of the CeZrRh-based mixed oxide particles 4 is carried on the surfaces of the CeZrRh-based mixed oxide particles 5 of the large-size second particle group, the Rh/ZrLa-alumina particles 6, and the La-containing alumina particles 7. The CeZrRh-based mixed oxide particles 4 of the small-size first particle group serve as a catalyst component, and also serve as binders which are interposed between the catalyst particles 5 and 6 to bind these catalyst particles 5 and 6 and enter a large number of fine recesses and fine holes in the surface of the support to prevent the catalyst layer from being peeled off from the support.

Examples and Comparative Examples of Embodiment 1 will be described hereinafter.

Example 1

The upper catalyst layer and the lower catalyst layer of the exhaust gas purification catalyst having a double-layer structure illustrated in FIG. 1 were formed by the following method.

—Preparation of CeZrRh-Based Mixed Oxide Powder—

As a Rh-doped mixed oxide component, a first CeZrRh-based mixed oxide powder (a first mixed oxide particle component) and a second CeZrRh-based mixed oxide powder (a second mixed oxide particle component) having different peaks in particle size distribution were prepared. The peak particle size in the particle size distribution of the first CeZrRh-based mixed oxide powder is smaller than that of the second CeZrRh-based mixed oxide powder.

First, it will be described how to prepare the second CeZrRh-based mixed oxide powder having a large peak particle size. Specifically, cerium nitrate hexahydrate (17.39 g), a zirconyl oxynitrate solution (79.90 g) containing 25.13%, by mass, of Zr in terms of $ZrO_2$, neodymium nitrate hexahydrate (7.81 g), and a rhodium nitrate solution (0.37 g) having a Rh concentration of 8.15% by mass are dissolved in ion-exchanged water (300 mL). This nitrate solution is mixed with an 8-fold dilution (900 mL) of 28%, by mass, of aqueous ammonia to be neutralized, thereby obtaining a coprecipitate. The coprecipitate is washed by centrifugation, dried in the air at 150° C. for a day and a night, ground, and then subjected to calcination of being kept at 500° C. for two hours in the air, thereby obtaining 30 g of a mixed oxide powder, which will be hereinafter referred to as a second CeZrRh-based mixed oxide powder. The composition of the second CeZrRh-based mixed oxide powder except Rh is $CeO_2:ZrO_2:Nd_2O_3=23:67:10$ (mass ratio), and the dissolution concentration of Rh is 0.1%, by mass.

The first CeZrRh-based mixed oxide powder having a small peak particle size can be obtained by wet grinding the second CeZrRh-based mixed oxide powder obtained in the manner described above. Specifically, ion-exchanged water is added to the second CeZrRh-based mixed oxide powder to produce a slurry (having a solid content of 25% by mass). The slurry is ball-milled using 0.5-mm zirconia beads (for about three hours), thereby obtaining a Rh-doped CeZrNd sol in which the first CeZrRh-based mixed oxide powder having a reduced particle size is dispersed. The composition of the first CeZrRh-based mixed oxide powder except Rh and the dissolution concentration of Rh therein are the same as those of the second CeZrRh-based mixed oxide powder.

FIG. 3 shows particle size distributions (i.e., frequency distributions) of the first CeZrRh-based mixed oxide powder and the second CeZrRh-based mixed oxide powder. The particle size distributions were measured with a laser diffraction particle size distribution analyzer produced by SHIMADZU CORPORATION. These CeZrRh-based mixed oxide powders have different peaks in particle size distribution. Specifically, the particle size distribution of the first CeZrRh-based mixed oxide powder has a peak in the particle size range from 100 nm to 300 nm, both inclusive. The particle size distribution of the second CeZrRh-based mixed oxide powder has a peak in the particle size range from 550 nm to 1200 nm, both inclusive.

In the first CeZrRh-based mixed oxide powder, the particle size in cumulative distribution for 10%, by mass, is 107 nm, the particle size in cumulative distribution for 50%, by mass, is 184 nm, and the particle size in cumulative distribution for 90%, by mass, is 287 nm. That is, the particle size in cumulative distribution for 10%, by mass, is 100 nm or more, and the particle size in cumulative distribution for 90%, by mass, is 300 nm or less. In the second CeZrRh-based mixed oxide powder, the particle size in cumulative distribution for 10%, by mass, is 576 nm, the particle size in cumulative distribution for 50%, by mass, is 848 nm, and the particle size in cumulative distribution for 90%, by mass, is 1160 nm. That is, the particle size in cumulative distribution for 10%, by mass, is 550 nm or more, and the particle size in cumulative distribution for 90%, by mass, is 1200 nm or less.

In the first CeZrRh-based mixed oxide powder having a particle size from 100 nm to 300 nm, both inclusive, the concentrations of Rh in the particle surfaces (to a depth of several nanometers) in five selected regions (each having a diameter of several micrometers) were measured by X-ray photoelectron spectroscopy (XPS). Likewise, in the second CeZrRh-based mixed oxide powder having a particle size from 550 nm to 1200 nm, both inclusive, the concentrations of Rh in the particle surfaces in five selected regions were measured by XPS. Specifically, the peak area of the wavelength specific to each of elements Ce, Zr, Nd, Rh, and O radiated from those regions for measurement was calculated to obtain the Rh concentrations (i.e., the ratios of the peak area of Rh to the peak area values of all the elements). Table 1 shows the results.

the first CeZrRh-based mixed oxide powder whose particle size has been reduced by grinding has a higher Rh concentration in the particle surfaces than that of the second CeZrRh-based mixed oxide powder before grinding.

With respect to the Rh concentration, the second CeZrRh-based mixed oxide particles have a particle size larger than that of the first CeZrRh-based mixed oxide particles, and thus, the amount of Rh buried in the second CeZrRh-based mixed oxide particles is larger than that in the first CeZrRh-based mixed oxide particles. When the second CeZrRh-based mixed oxide particles are ground, Rh buried in the particles is partially exposed at the surfaces of ground particles (i.e., the first CeZrRh-based mixed oxide particles). At least part of Rh exposed by the grinding is detected as Rh radiating a wavelength specific to this element (Rh) in measurement regions for XPS. This result is considered to cause the Rh concentration in the particle surfaces of the first CeZrRh-based mixed oxide powder obtained by XPS to be higher than that of the second CeZrRh-based mixed oxide powder.

Thus, the fact that the Rh concentration of the first CeZrRh-based mixed oxide powder is higher than that of the second CeZrRh-based mixed oxide powder means that Rh buried in the particles comes to be exposed at the particle surface as a result of grinding. Accordingly, the amount of Rh exposed at the particle surfaces in the first CeZrRh-based mixed oxide powder is larger than that in the second CeZrRh-based mixed oxide powder, when compared to each other per a unit mass.

—Formation of Lower Catalyst Layer—

A CeZrNd mixed oxide (where $CeO_2:ZrO_2:Nd_2O_3=23:67:10$ (mass ratio)) powder, a Pd/La-containing alumina powder in which Pd was carried on $Al_2O_3$ containing 4%, by mass, of $La_2O_3$, a Pd/CeZrNd mixed oxide powder in which Pd was carried on a CeZrNd mixed oxide (where $CeO_2:ZrO_2:Nd_2O_3=23:67:10$ (mass ratio)) powder, and zirconyl nitrate (a binder) were mixed together with ion-exchanged water to produce a slurry, and a support was wash-coated with the slurry, thereby forming a lower catalyst layer. The above-mentioned carrying of Pd was performed by evaporation to dryness. In the other Examples and Comparative Examples which will be described later, the evaporation to dryness was also employed to carry a catalytic metal such as Pd.

As the support described above, a cordierite honeycomb support (having a volume of 1 L) having a cell wall thickness of 3.5 mil ($8.89 \times 10^{-2}$ mm) and including 600 cells per square inch (645.16 $mm^2$) was used. This support was also used in the other Examples and Comparative Examples which will be described later. Table 2 shows the contents of catalyst components and other materials (in terms of mass per 1 L of the support).

TABLE 1

| | Surface Rh concentration (at. %) | | | | |
|---|---|---|---|---|---|
| | Region 1 | Region 2 | Region 3 | Region 4 | Region 5 |
| First CeZrRh-based mixed oxide powder | 0.071 | 0.079 | 0.082 | 0.084 | 0.090 |
| Second CeZrRh-based mixed oxide powder | 0.040 | 0.045 | 0.047 | 0.052 | 0.059 |

The Rh concentration in the particle surfaces of the first CeZrRh-based mixed oxide powder is in the range from 0.07 atomic percent (hereinafter referred to as "at. %") to 0.09 at. %, both inclusive. The Rh concentration in the particle surfaces of the second CeZrRh-based mixed oxide powder is in the range from 0.04 at. % to 0.06 at. %, both inclusive. That is, —Formation of Upper Catalyst Layer—

A Rh-doped CeZrNd sol in which the first CeZrRh-based mixed oxide powder was dispersed, a Rh/second CeZrRh-based mixed oxide powder, a Rh/ZrLa-alumina powder, and a La-containing alumina (containing 4%, by mass, of $La_2O_3$) powder were mixed together with ion-exchanged water to produce a slurry, and the lower catalyst layer was washcoated with the slurry, thereby forming an upper catalyst layer.

In the Rh/second CeZrRh-based mixed oxide powder, the second CeZrRh-based mixed oxide powder was impregnated with a Rh nitrate solution, dried at 200° C. for two hours, and calcined at 500° C. for two hours so that Rh was carried on the Rh-doped second CeZrRh-based mixed oxide powder.

The Rh/ZrLa-alumina powder was prepared in the following manner. Specifically, an activated alumina powder was dispersed in a mixed solution of zirconium nitrate and lanthanum nitrate, and aqueous ammonia was added to the resultant solution to produce a precipitate. The precipitate was filtered, washed, dried at 200° C. for two hours, and calcined at 500° C. for two hours, thereby obtaining activated alumina particles whose surfaces were coated with a ZrLa mixed oxide. The obtained activated alumina particles were mixed with a rhodium nitrate solution, and subjected to evaporation to dryness, thereby obtaining a Rh/ZrLa-alumina powder. The composition of ZrLa-alumina was $ZrO_2:La_2O_3:Al_2O_3=38:2:60$ (mass ratio).

The contents of catalyst components and other materials are shown in Table 2. Since the Rh-doped CeZrNd sol serves as a binder in the upper catalyst layer, no dedicated binder material (i.e., zirconyl nitrate) is contained. The content of each component shown in Table 2 is expressed in terms of dry weight.

The first CeZrRh-based mixed oxide powder is substantially uniformly dispersed in the upper catalyst layer. Accordingly, part of the first CeZrRh-based mixed oxide particles is carried on the surfaces of the large-size Rh/second CeZrRh-based mixed oxide particles, the Rh/ZrLa-alumina particles, and the La-containing alumina particles. The first CeZrRh-based mixed oxide powder serves as a binder in the upper catalyst layer.

Example 2

The lower catalyst layer of Example 2 had the same composition as that of Example 1 except that a first CeZrRh-based mixed oxide powder (10.000 g/L) was included instead of zirconyl nitrate (a binder) of Example 1. The upper catalyst layer of Example 2 had the same composition as that of Example 1 except that the amount of the Rh/second CeZrRh-based mixed oxide was 50.012 g/L (where the second CeZrRh-based mixed oxide powder: 50.000 g/L and the amount of Rh carried as a result of impregnation: 0.012 g/L).

Figure 5:
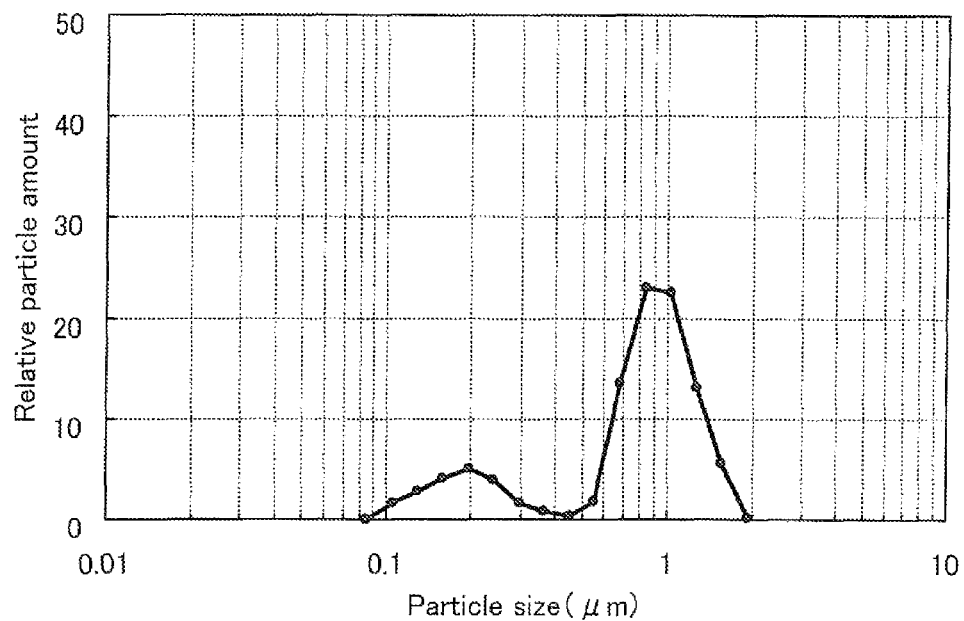
FIG. 5 is a graph showing a particle size distribution of a CeZrRh-based mixed oxide powder according to Example 2.

FIG. 5 shows a particle size distribution of the CeZrRh-based mixed oxide powder in the upper catalyst layer (i.e., a particle size distribution of a mixture of the first CeZrRh-based mixed oxide powder and the second CeZrRh-based mixed oxide powder). This particle size distribution has two peaks respectively in the particle size range from 100 nm to 300 nm, both inclusive, and the particle size range from 550

TABLE 2

| | Components | Example 1 | Example 2 | Comparative Example |
|---|---|---|---|---|
| Upper catalyst layer | First CeZrRh-based mixed oxide powder | 10.000 g/L | 10.000 g/L | — |
| | Rh/second CeZrRh-based mixed oxide powder | 60.012 g/L (Rh = 0.012 g/L) | 50.012 g/L (Rh = 0.012 g/L) | 70.012 g/L (Rh = 0.012 g/L) |
| | Rh/ZrLa-alumina powder | 30.035 g/L (Rh = 0.035 g/L) | 30.035 g/L (Rh = 0.035 g/L) | 30.035 g/L (Rh = 0.035 g/L) |
| | La-containing alumina powder | 10.000 g/L | 10.000 g/L | 10.000 g/L |
| | Zirconyl nitrate (binder) | — | — | 10.000 g/L |
| Lower catalyst layer | First CeZrRh-based mixed oxide powder | — | 10.000 g/L | — |
| | CeZrNd mixed oxide powder | 20.000 g/L | 20.000 g/L | 20.000 g/L |
| | Pd/La-containing alumina powder | 45.389 g/L (Pd = 0.389 g/L) | 45.389 g/L (Pd = 0.389 g/L) | 45.389 g/L (Pd = 0.389 g/L) |
| | Pd/CeZrNd mixed oxide powder | 35.194 g/L (Pd = 0.194 g/L) | 35.194 g/L (Pd = 0.194 g/L) | 35.194 g/L (Pd = 0.194 g/L) |
| | Zirconyl nitrate (binder) | 10.000 g/L | — | 10.000 g/L |

Note
"(Rh = 0.012 g/L)" of Rh/second CeZrRh-based mixed oxide powder in the upper catalyst layer is the amount of Rh carried on second CeZrRh-based mixed oxide powder by impregnation.

—Particle Size Distribution of CeZrRh-Based Mixed Oxide Powder in Upper Catalyst Layer—

FIG. 4 shows a particle size distribution of the CeZrRh-based mixed oxide powder in the upper catalyst layer (i.e., a particle size distribution of a mixture of the first CeZrRh-based mixed oxide powder and the second CeZrRh-based mixed oxide powder). This particle size distribution has two peaks respectively in the particle size range from 100 nm to 300 nm, both inclusive, and the particle size range from 550 nm to 1200 nm, both inclusive. Specifically, the first particle group having a small particle size relative to a valley (around 450 nm (i.e., 0.45 μm)) between these peaks has a peak around 200 nm (i.e., 0.2 μm), whereas the second particle group having a large particle size relative to the valley has a peak around 850 nm (i.e., 0.85 μm).

FIGS. 3 and 4 show that a large part of the first particle group is made of the first CeZrRh-based mixed oxide powder, and a large part of the second particle group is made of the second CeZrRh-based mixed oxide powder.

nm to 1200 nm, both inclusive. Specifically, the first particle group with a small size relative to a valley (around 450 nm (i.e., 0.45 μm)) between these peaks has a peak around 200 nm (i.e., 0.2 μm), whereas the second particle group with a large size relative to the valley has a peak around 850 nm (i.e., 0.85 μm).

In Example 2, the first CeZrRh-based mixed oxide powder was included in both of the upper catalyst layer and the lower catalyst layer, and substantially uniformly dispersed in each of the layers. Accordingly, in the same manner as in Example 1, in the upper catalyst layer, part of the first CeZrRh-based mixed oxide particles was carried on the surfaces of the large-size Rh/second CeZrRh-based mixed oxide particles, the Rh/ZrLa-alumina particles, and the La-containing alumina particles. In addition, the first CeZrRh-based mixed oxide powder served as a binder in the upper catalyst layer. In the lower catalyst layer, part of the first CeZrRh-based mixed oxide powder was also carried on CeZrNd mixed oxide particles, the Pd/La-containing alumina particles, and Pd/CeZrNd mixed oxide particles. The first CeZrRh-based mixed oxide powder served as a binder in the lower catalyst layer.

Comparative Example 1

The lower catalyst layer of Comparative Example 1 had the same composition as that of Example 1. The upper catalyst layer of Comparative Example 1 had the same composition as that of Example 1 except that zirconyl nitrate (a binder) (10.000 g/L) was included instead of the first CeZrRh-based mixed oxide powder of Example 1, and that the amount of the Rh/second CeZrRh-based mixed oxide powder was 70.012 g/L (where the second CeZrRh-based mixed oxide powder: 70.000 g/L and the amount of Rh carried as a result of impregnation: 0.012 g/L). In Comparative Example 1, the amount of the second CeZrRh-based mixed oxide powder in the upper catalyst layer was equal to the sum of the amounts of the first CeZrRh-based mixed oxide powder and the second CeZrRh-based mixed oxide powder in the upper catalyst layer of Example 1.

(Exhaust Gas Purification Performance)

The catalysts of Examples 1 and 2 and Comparative Example 1 were subjected to bench aging. In the bench aging, each catalyst was attached to an engine exhaust system, and a cycle of (1) causing exhaust gas with an A/F ratio of 14 to flow for 15 seconds, (2) causing exhaust gas with an A/F ratio of 17 to flow for 5 seconds, and then (3) causing exhaust gas with an A/F ratio of 14.7 to flow for 40 seconds, was repeated for 50 hours in total. In addition, in the bench aging, the engine was driven such that the gas temperature at a catalyst entrance was kept at 900° C.

Figure 6:
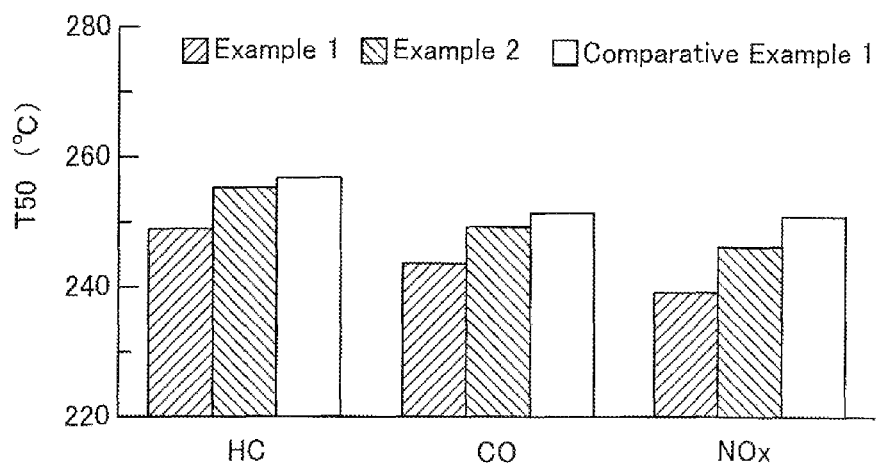
FIG. 6 is a graph showing exhaust gas purification performance of Examples 1 and 2 and Comparative Example 1.

Thereafter, a core sample having a support volume of about 25 mL (diameter: 25.4 mm and length: 50 mm) was cut out from each catalyst, and mounted to a model gas flow reactor. Then, the light-off temperature T50 (° C.) concerning purification of HC, CO, and NOx was measured. The temperature T50 (° C.) was the gas temperature at a catalyst entrance when purification efficiency reached 50% by gradually increasing the temperature of model gas flowing in the catalyst from room temperature. The model gas had an A/F ratio of 14.7±0.9. Specifically, a mainstream gas with an A/F ratio of 14.7 was allowed to constantly flow, and a predetermined amount of gas for changing the A/F ratio was added in pulses at a rate of 1 Hz, so that the A/F ratio was forcedly oscillated within the range of ±0.9. The space velocity SV was set at 60000/h$^{-1}$, and the rate of temperature increase was set at 30° C./min Table 3 shows gas compositions at A/F=14.7, A/F=13.8, and A/F=15.6, respectively. FIG. 6 shows the measurement result of the light-off temperature T50.

TABLE 3

| | A/F | | |
|---|---|---|---|
| | 13.8 | 14.7 | 15.6 |
| $C_3H_6$ (ppm) | 541 | 555 | 548 |
| CO (%) | 2.35 | 0.60 | 0.59 |
| NO (ppm) | 975 | 1000 | 980 |
| $CO_2$ (%) | 13.55 | 13.90 | 13.73 |
| $H_2$ (%) | 0.85 | 0.20 | 0.20 |
| $O_2$ (%) | 0.58 | 0.60 | 1.85 |
| $H_2O$ (%) | 10 | 10 | 10 |

As shown in FIG. 6, the light-off temperatures T50 of Examples 1 and 2 are lower than that of Comparative Example 1 for each of HC, CO, and NOx, and thus, Examples 1 and 2 exhibit excellent exhaust gas purification performance. The first CeZrRh-based mixed oxide powder having a small particle size and included in the catalyst layers of Examples 1 and 2 exhibits a lager proportion of a catalytic metal Rh exposed at the particle surfaces than that in the second CeZrRh-based mixed oxide powder having a large particle size. Accordingly, the oxygen storage/release capacity and the catalyst activity of the first CeZrRh-based mixed oxide powder are higher than those of the second CeZrRh-based mixed oxide powder. This result is considered to cause an improvement of exhaust gas purification performance in Examples 1 and 2.

In addition, part of the first CeZrRh-based mixed oxide powder having a small particle size in Examples 1 and 2 is supported on, for example, the large-size Rh/second CeZrRh-based mixed oxide particles, the Rh/ZrLa-alumina particles, and the La-containing alumina particles. Accordingly, even when the first CeZrRh-based mixed oxide powder is exposed to high-temperature exhaust gas, agglomeration is not likely to occur. Further, since the first CeZrRh-based mixed oxide particles having high oxygen storage/release capacity are carried on other catalyst components such as the Rh/ZrLa-alumina particles, the activities of these catalyst components are also increased. This result is considered to contribute to excellent exhaust gas purification performance in Examples 1 and 2.

Moreover, the light-off temperature in Example 1 is lower than that in Example 2. This phenomenon is considered to be because the amount of the second CeZrRh-based mixed oxide powder in the upper catalyst layer of Example 2 is smaller than that of Example 1. Specifically, in Example 2, the first CeZrRh-based mixed oxide powder is also added to the lower catalyst layer. This addition does not greatly contribute to improvement of exhaust gas purification performance, and rather, degradation of catalyst performance due to a decrease in the amount of the second CeZrRh-based mixed oxide powder in the upper catalyst layer improves the exhaust gas purification performance. This comparison between Examples 1 and 2 shows that the addition of the first CeZrRh-based mixed oxide powder to the upper catalyst layer can more greatly improve exhaust gas purification performance than the addition of the first CeZrRh-based mixed oxide powder to the lower catalyst layer.

Embodiment 2

In Embodiment 1, both of the first mixed oxide particle component and the second mixed oxide particle component are of a Rh-doped type, i.e., contain Rh as a catalytic metal X. On the other hand, in Embodiment 2, the first mixed oxide particle component is of a Rh-doped type, and the second mixed oxide particle component is not of a Rh-doped type, but of a Rh post-carried type.

Embodiment 2-1

In this embodiment, the catalyst layer is a single layer. Specifically, a catalyst layer is formed by using, as a binder material, Rh-doped mixed oxide particles which are a first mixed oxide particle component. This catalyst layer includes a Rh/CeZrNd material which is a second mixed oxide particle component. Examples 3 to 6 and Comparative Examples 2 to 5 of this embodiment will be described hereinafter.

Example 3

A Rh-doped CeZr sol, a Rh/CeZrNd material, and ion-exchanged water were mixed together to produce a slurry. A honeycomb support was coated with the slurry, thereby forming a catalyst layer.

The Rh-doped CeZr sol was obtained by dispersing, in water, a Rh-doped CeZr mixed oxide powder (with a Rh concentration of 0.05% by mass) in which a CeZr mixed oxide (where $CeO_2:ZrO_2=25:75$ (mass ratio)) was doped with Rh. The Rh-doped CeZr sol was prepared by the same method as that for the Rh-doped CeZrNd sol of Example 1 except that a mixture of cerium nitrate hexahydrate, a zirconyl oxynitrate solution, and a rhodium nitrate solution dissolved in ion-exchanged water was used as a nitrate solution. As in the Rh-doped CeZrNd sol, the particle size distribution (i.e., frequency distribution) of the Rh-doped CeZr sol had a peak in the particle size range from 100 nm to 300 nm, both inclusive.

In the Rh/CeZrNd material, Rh was carried on Zr-rich CeZrNd mixed oxide particles. The composition of the CeZrNd mixed oxide particles was $CeO_2:ZrO_2:Nd_2O_3=10:80:10$ (mass ratio), and the Rh concentration therein was 0.12% by mass. The particle size distribution (i.e., frequency distribution) of the CeZrNd mixed oxide particles had a peak in the particle size range from 550 nm to 1200 nm, both inclusive.

With respect to the amount (per 1 L of the support) of each carried component in the catalyst layer, the amount of the Rh-doped CeZr mixed oxide powder (a binder) was 12 g/L, and the amount of the Rh/CeZrNd material was 70 g/L.

Example 4

A catalyst having the same composition as that of Example 3 was prepared except for employing a Rh-doped CeZrNdY sol instead of the Rh-doped CeZr sol. The Rh-doped CeZrNdY sol was obtained by dispersing, in water, a Rh-doped CeZrNdY mixed oxide powder (with a Rh concentration of 0.05% by mass) in which a CeZrNdY mixed oxide (where $CeO_2:ZrO_2:Nd_2O_3:Y_2O_3=10:80:5:5$ (mass ratio)) was doped with Rh. The Rh-doped CeZrNdY sol was prepared by the same method as that for the Rh-doped CeZrNd sol of Example 1 except that a mixture of cerium nitrate hexahydrate, a zirconyl oxynitrate solution, neodymium nitrate hexahydrate, yttrium nitrate hexahydrate, and a rhodium nitrate solution dissolved in ion-exchanged water was used as a nitrate solution. As in the Rh-doped CeZrNd sol, the particle size distribution (i.e., frequency distribution) of the Rh-doped CeZrNdY sol had a peak in the particle size range from 100 nm to 300 nm, both inclusive.

Example 5

A catalyst having the same composition as that of Example 3 was prepared except for employing a Rh-doped $CeO_2$ sol instead of the Rh-doped CeZr sol. The Rh-doped $CeO_2$ sol was obtained by dispersing, in water, a Rh-doped $CeO_2$ mixed oxide powder (with a Rh concentration of 0.05% by mass) in which $CeO_2$ was doped with Rh. The Rh-doped $CeO_2$ sol was prepared by the same method as that for the Rh-doped CeZrNd sol of Example 1 except that a mixture of cerium nitrate hexahydrate and a rhodium nitrate solution dissolved in ion-exchanged water was used as a nitrate solution. As in the Rh-doped CeZrNd sol, the particle size distribution (i.e., frequency distribution) of the Rh-doped $CeO_2$ sol had a peak in the particle size range from 100 nm to 300 nm, both inclusive.

Example 6

A catalyst having the same composition as that of Example 3 was prepared except for employing a Rh-doped CeZrNd sol instead of the Rh-doped CeZr sol, and employing a Ce-rich Rh/CeZrNd material instead of the Zr-rich Rh/CeZrNd material.

Unlike the Rh-doped CeZrNd sol of Example 1, in the Rh-doped CeZrNd sol of Example 6, the composition of the CeZrNd mixed oxide was $CeO_2:ZrO_2:Nd_2O_3=10:80:10$ (mass ratio), and the Rh concentration therein was 0.05% by mass. The Rh-doped CeZrNd sol was obtained by the same method as that for the Rh-doped CeZrNd sol of Example 1. The particle size distribution (i.e., frequency distribution) of the Rh-doped CeZrNd sol of this example also had a peak in the particle size range from 100 nm to 300 nm, both inclusive.

In the Ce-rich Rh/CeZrNd material, Rh was carried on the Ce-rich CeZrNd mixed oxide particles. The composition of the CeZrNd mixed oxide particles was $CeO_2:ZrO_2:Nd_2O_3=65:25:10$ (mass ratio), and the Rh concentration therein was 0.12% by mass. The particle size distribution (i.e., frequency distribution) of the CeZrNd mixed oxide particles had a peak in the particle size range from 550 nm to 1200 nm, both inclusive.

Comparative Example 2

A catalyst having the same composition as that of Example 3 was prepared except for employing a $ZrO_2$ sol (not doped with Rh) instead of the Rh-doped CeZr sol, and setting the amount of the carried Rh/CeZrNd material at 75 g/L in order to set the amount of carried Rh at a value equal to that in Example 3. The $ZrO_2$ sol was obtained by dispersing $ZrO_2$ powder in water.

Comparative Example 3

A catalyst having the same composition as that of Example 3 was prepared except for employing a CeZr sol (not doped with Rh) instead of the Rh-doped CeZr sol, and setting the amount of the carried Rh/CeZrNd material at 75 g/L in order to set the amount of carried Rh at a value equal to that in Example 3. The CeZr sol was obtained by dispersing CeZr mixed oxide powder (where $CeO_2:ZrO_2=25:75$ (mass ratio)) in water.

Comparative Example 4

A catalyst having the same composition as that of Example 3 was prepared except for employing a $CeO_2$ sol (not doped with Rh) instead of the Rh-doped CeZr sol, and setting the amount of the carried Rh/CeZrNd material at 75 g/L in order to set the amount of carried Rh at a value equal to that in Example 3. The $CeO_2$ sol was obtained by dispersing $CeO_2$ powder in water.

Comparative Example 5

A catalyst having the same composition as that of Example 3 was prepared except for employing a $ZrO_2$ sol which was identical to that used in Comparative Example 2 instead of the Rh-doped CeZr sol, employing a Ce-rich Rh/CeZrNd material instead of the Zr-rich Rh/CeZrNd material, and setting the amount of the carried Rh/CeZrNd material at 75 g/L in order to set the amount of carried Rh at a value equal to that in Example 3.

Embodiment 2-2

In this embodiment, a single catalyst layer is employed as in Embodiment 2-1. The single catalyst layer includes: Rh-doped mixed oxide particles (a binder material) as a first mixed oxide particle component; a Zr-rich Rh/CeZrNd material as a second mixed oxide particle component; and Rh/ZrLa-alumina. Examples 7-10 and Comparative Examples 6-9 of EMBODIMENT 2-2 will be described hereinafter.

Example 7

In Example 7, the catalyst layer of Example 3 further included Rh/ZrLa-alumina. The composition of ZrLa-alumina was $ZrO_2:La_2O_3:Al_2O_3=38.5:2:59.5$ (mass ratio), and the Rh concentration therein was 0.1% by mass. With respect to the amount of each carried component, a Rh-doped CeZr mixed oxide powder (a binder) in a Rh-doped CeZr sol was 12 g/L, a Rh/CeZrNd material was 70 g/L, and Rh/ZrLa-alumina was 30 g/L.

Example 8

A catalyst having the same composition as that of Example 7 was prepared except for employing a Rh-doped CeZrNdY sol which was identical to that used in Example 4 instead of the Rh-doped CeZr sol.

Example 9

A catalyst having the same composition as that of Example 7 was prepared except for employing a $CeO_2$ sol which was identical to that used in Example 5 instead of the Rh-doped CeZr sol.

Example 10

A catalyst having the same composition as that of Example 7 was prepared except for employing a Rh-doped CeZrNd sol which was identical to that used in Example 6 instead of the Rh-doped CeZr sol, and employing a Ce-rich Rh/CeZrNd material which was identical to that used in Example 6 instead of the Zr-rich Rh/CeZrNd material.

Comparative Example 6

A catalyst having the same composition as that of Example 7 was prepared except for employing a $ZrO_2$ sol which was identical to that used in Comparative Example 2 instead of the Rh-doped CeZr sol, and setting the amount of the carried Rh/CeZrNd material at 75 g/L in order to set the amount of carried Rh at a value equal to that in Example 7.

Comparative Example 7

A catalyst having the same composition as that of Example 7 was prepared except for employing a CeZr sol which was identical to that used in Comparative Example 3 instead of the Rh-doped CeZr sol, and setting the amount of the carried Rh/CeZrNd material at 75 g/L in order to set the amount of carried Rh at a value equal to that in Example 7.

Comparative Example 8

A catalyst having the same composition as that of Example 7 was prepared except for employing a $CeO_2$ sol which was identical to that used in Comparative Example 4 instead of the Rh-doped CeZr sol, and setting the amount of the carried Rh/CeZrNd material at 75 g/L in order to set the amount of carried Rh at a value equal to that in Example 7.

Comparative Example 9

A catalyst having the same composition as that of Example 7 was prepared except for employing a $ZrO_2$ sol which was identical to that used in Comparative Example 2 instead of the Rh-doped CeZr sol, employing a Ce-rich Rh/CeZrNd material which was identical to that used in Example 6 instead of the Zr-rich Rh/CeZrNd material, and setting the amount of the carried Rh/CeZrNd material at 75 g/L in order to set the amount of carried Rh at a value equal to that in Example 7.

Embodiment 3

In this embodiment, a catalyst having a double-layer structure and illustrated in FIG. 1 includes upper and lower catalyst layers having the following compositions.

Example 11

The upper catalyst layer included a mixture of: Rh-doped CeZrNdY, as a binder, in a Rh-doped CeZrNdY sol which was identical to that in Example 4; a Zr-rich Rh/CeZrNd material which was identical to that in Example 4; Rh/ZrLa-alumina which was identical to that in Example 7; and La-alumina (carrying no catalytic metal). The lower catalyst layer included a mixture of: a Pd/CeZrNd material; Pd/La-alumina; a CeZrNd material (carrying no catalytic metal); and $ZrO_2$, as a binder, in a $ZrO_2$ sol.

In the upper catalyst layer, La-alumina (carrying no catalytic metal) was activated alumina containing 4%, by mass, of $La_2O_3$. In the Pd/CeZrNd material in the lower catalyst layer, Pd was carried on CeZrNd mixed oxide particles containing Ce, Zr, and Nd. The composition of this mixed oxide was $CeO_2:ZrO_2:Nd_2O_3=23:67:10$ (mass ratio), and the amount of carried Pd was 0.55% by mass. In Pd/La-alumina, Pd was carried on La-alumina containing 4%, by mass of $La_2O_3$, and the Pd concentration was 0.86% by mass. The CeZrNd material (carrying no catalytic metal) was the same as the CeZrNd material in the Pd/CeZrNd material.

With respect to the amount of each component carried on a support, Rh-doped CeZrNdY in the upper catalyst layer was 12 g/L, the Zr-rich Rh/CeZrNd material was 70 g/L, Rh/ZrLa-alumina was 30 g/L, and La-alumina (carrying no catalytic metal) was 10 g/L. In the lower catalyst layer, the Pd/CeZrNd material was 35 g/L, Pd/La-alumina was 45 g/L, the CeZrNd material (carrying no catalytic metal) was 20 g/L, and the $ZrO_2$ binder was 11 g/L.

Comparative Example 10

A catalyst having the same composition as that of Example 11 was prepared except for employing a $ZrO_2$ binder, as a binder of the upper catalyst layer, instead of Rh-doped CeZrNdY, and setting the amount of the carried Rh/CeZrNd material at 75 g/L in order to set the amount of carried Rh at a value equal to that in Example 11.

(Exhaust Gas Purification Performance)

After bench aging has been performed on each catalyst of Embodiments 2 and 3 in the same manner as in Embodiment 1, a core sample having a support volume of about 25 mL (diameter: 25.4 mm and length: 50 mm) was cut out from the catalyst, and the light-off temperature T50 (° C.) and the exhaust gas purification efficiency C400 in HC, CO, and NOx purification were measured under the same conditions as those in Embodiment 1. The exhaust gas purification efficiency C400 was the purification efficiency for each of HC, CO, and NOx measured when the temperature of model exhaust gas at a catalyst entrance was 400° C. Table 4 shows the results.

TABLE 4

| | | Binder | Anther component | T50 (° C.) HC | T50 (° C.) CO | T50 (° C.) NOx | C400(%) HC | C400(%) CO | C400(%) NOx |
|---|---|---|---|---|---|---|---|---|---|
| Embodiment 2-1 | Example 3 | Rh-doped CeZr sol | Rh/CeZrNd material (Zr-rich) | 270 | 263 | 258 | 97 | 97 | 100 |
| | Example 4 | Rh-doped CeZrNdY sol | Rh/CeZrNd material (Zr-rich) | 267 | 260 | 253 | 97 | 97 | 100 |
| | Example 5 | Rh-doped $CeO_2$ sol | Rh/CeZrNd material (Zr-rich) | 274 | 265 | 260 | 97 | 97 | 100 |
| | Comparative Example 2 | $ZrO_2$ sol | Rh/CeZrNd material (Zr-rich) | 276 | 265 | 263 | 97 | 97 | 100 |
| | Comparative Example 3 | CeZr sol | Rh/CeZrNd material (Zr-rich) | 300 | 290 | 289 | 95 | 95 | 98 |
| | Comparative Example 4 | $CeO_2$ sol | Rh/CeZrNd material (Zr-rich) | 305 | 292 | 293 | 95 | 95 | 98 |
| | Example 6 | Rh-doped CeZrNd sol | Rh/CeZrNd material (Ce-rich) | 367 | 360 | 332 | 87 | 67 | 78 |
| | Comparative Example 5 | $ZrO_2$ sol | Rh/CeZrNd material (Ce-rich) | 390 | 396 | 365 | 59 | 51 | 68 |
| Embodiment 2-2 | Example 7 | Rh-doped CeZr sol | Rh/CeZrNd material (Zr-rich) + Rh/ZrLa-alumina | 268 | 259 | 254 | 98 | 97 | 100 |
| | Example 8 | Rh-doped CeZrNdY sol | Rh/CeZrNd material (Zr-rich) + Rh/ZrLa-alumina | 265 | 257 | 251 | 98 | 97 | 100 |
| | Example 9 | Rh-doped $CeO_2$ sol | Rh/CeZrNd material (Zr-rich) + Rh/ZrLa-alumina | 271 | 261 | 255 | 97 | 97 | 100 |
| | Comparative Example 6 | $ZrO_2$ sol | Rh/CeZrNd material (Zr-rich) + Rh/ZrLa-alumina | 273 | 263 | 259 | 97 | 97 | 100 |
| | Comparative Example 7 | CeZr sol | Rh/CeZrNd material (Zr-rich) + Rh/ZrLa-alumina | 296 | 286 | 286 | 97 | 97 | 100 |
| | Comparative Example 8 | $CeO_2$ sol | Rh/CeZrNd material (Zr-rich) + Rh/ZrLa-alumina | 300 | 289 | 288 | 97 | 97 | 100 |
| | Example 10 | Rh-doped CeZrNd sol | Rh/CeZrNd material (Ce-rich) + Rh/ZrLa-alumina | 338 | 316 | 298 | 91 | 78 | 86 |
| | Comparative Example 9 | $ZrO_2$ sol | Rh/CeZrNd material (Ce-rich) + Rh/ZrLa-alumina | 345 | 326 | 305 | 89 | 76 | 85 |
| Embodiment 3 | Example 11 | Rh-doped CeZrNdY sol | Double-layer structure of upper and lower catalyst layers | 254 | 248 | 245 | 99 | 99 | 100 |
| | Comparative Example 10 | $ZrO_2$ sol | Double-layer structure of upper and lower catalyst layers | 261 | 255 | 254 | 99 | 99 | 100 |

Comparison between Examples 3-5 and Comparative Examples 2 and 3 shows that even with the same Rh amount in the catalyst layer, the use of a Rh-doped Ce-containing oxide sol as a binder material improves light-off performance of the catalyst and enhances exhaust gas purification efficiency. Among Examples 3-5, Example 4 employing the Rh-doped CeZrNdY sol shows particularly excellent results. Comparison between Examples 7-9 and Comparative Examples 6-8 also shows that the use of the Rh-doped Ce-containing oxide sol is advantageous. The results on Examples 7-9 also show that the Rh-doped CeZrNdY sol is particularly advantageous.

Comparison between Example 6 and Comparative Example 5 and comparison between Example 10 and Comparative Example 9 show advantageousness of the Rh-doped Ce-containing oxide sol even in a case where another component is a Ce-rich Rh/CeZrNd material. Comparison between Example 11 and Comparative Example 10 shows advantageousness of the Rh-doped Ce-containing oxide sol in the double-layer structure.

What is claimed is:
1. An exhaust gas purification catalyst, comprising a support and a catalyst layer provided on the support, wherein
the catalyst layer includes a plurality of types of mixed oxide particle components containing Ce,
the plurality of types of mixed oxide particle components include a first mixed oxide particle component containing Ce and a catalytic metal which is partially exposed at particle surfaces, and a second mixed oxide particle component containing Ce, Zr, and a rare earth metal except Ce,
a particle size distribution of the first mixed oxide particle component has a peak in the particle size range from 100 nm to 300 nm, both inclusive,
a particle size distribution of the second mixed oxide particle component has a peak in a particle size range higher than the particle size range in which the first mixed oxide particle component has the peak, and
at least part of particles of the first mixed oxide particle component is attached to at least part of particles of the second mixed oxide particle component.

2. The exhaust gas purification catalyst of claim 1, wherein the particle size distribution of the second mixed oxide particle component has a peak in the particle size range from 550 nm to 1200 nm, both inclusive.

3. The exhaust gas purification catalyst of claim 2, wherein the second mixed oxide particle component contains the catalytic metal in addition to Ce, Zr, and the rare earth metal except Ce, and
the catalytic metal in the second mixed oxide particle component is partially exposed at particle surfaces.

4. The exhaust gas purification catalyst of claim 1, wherein the first mixed oxide particle component contains, in addition to Ce and the catalytic metal, a rare earth metal except Ce.

5. The exhaust gas purification catalyst of claim 2, wherein the first mixed oxide particle component contains, in addition to Ce and the catalytic metal, a rare earth metal except Ce.

6. The exhaust gas purification catalyst of claim 3, wherein the first mixed oxide particle component contains, in addition to Ce and the catalytic metal, a rare earth metal except Ce.

7. The exhaust gas purification catalyst of claim 1, wherein a concentration of a catalytic metal X in surfaces of at least part of particles of the first mixed oxide particle component in the particle size range from 100 nm to 300 nm, both inclusive, is in the range from 0.07 atomic percent to 0.09 atomic percent, both inclusive, when measured by X-ray photoelectron spectroscopy.

8. The exhaust gas purification catalyst of claim 2, wherein a concentration of a catalytic metal X in surfaces of at least part of particles of the first mixed oxide particle component in the particle size range from 100 nm to 300 nm, both inclusive, is in the range from 0.07 atomic percent to 0.09 atomic percent, both inclusive, when measured by X-ray photoelectron spectroscopy.

9. The exhaust gas purification catalyst of claim 3, wherein a concentration of a catalytic metal X in surfaces of at least part of particles of the first mixed oxide particle component in the particle size range from 100 nm to 300 nm, both inclusive, is in the range from 0.07 atomic percent to 0.09 atomic percent, both inclusive, when measured by X-ray photoelectron spectroscopy.

10. The exhaust gas purification catalyst of claim 1, wherein a concentration of a catalytic metal X in surfaces of at least part of particles of the second mixed oxide particle component in the particle size range from 550 nm to 1200 nm, both inclusive, is in the range from 0.04 atomic percent to 0.06 atomic percent, both inclusive, when measured by X-ray photoelectron spectroscopy.

11. The exhaust gas purification catalyst of claim 2, wherein a concentration of a catalytic metal X in surfaces of at least part of particles of the second mixed oxide particle component in the particle size range from 550 nm to 1200 nm, both inclusive, is in the range from 0.04 atomic percent to 0.06 atomic percent, both inclusive, when measured by X-ray photoelectron spectroscopy.

12. The exhaust gas purification catalyst of claim 3, wherein a concentration of a catalytic metal X in surfaces of at least part of particles of the second mixed oxide particle component in the particle size range from 550 nm to 1200 nm, both inclusive, is in the range from 0.04 atomic percent to 0.06 atomic percent, both inclusive, when measured by X-ray photoelectron spectroscopy.

13. The exhaust gas purification catalyst of claim 1, wherein the catalyst layer includes a lower catalyst layer provided on the support and an upper catalyst layer provided on top of, or above, the lower catalyst layer, and
the first mixed oxide particle component and the second mixed oxide particle component are included in the upper catalyst layer.

14. The exhaust gas purification catalyst of claim 2, wherein the catalyst layer includes a lower catalyst layer provided on the support and an upper catalyst layer provided on top of, or above, the lower catalyst layer, and
the first mixed oxide particle component and the second mixed oxide particle component are included in the upper catalyst layer.

15. The exhaust gas purification catalyst of claim 3, wherein the catalyst layer includes a lower catalyst layer provided on the support and an upper catalyst layer provided on top of, or above, the lower catalyst layer, and
the first mixed oxide particle component and the second mixed oxide particle component are included in the upper catalyst layer.

16. The exhaust gas purification catalyst of claim 1, wherein the catalyst layer includes ZrLa-alumina particles in which a ZrLa mixed oxide containing Zr and La is carried on activated alumina particles, and
part of particles of the first mixed oxide particle component is attached to the ZrLa-alumina particles.

17. The exhaust gas purification catalyst of claim 2, wherein the catalyst layer includes ZrLa-alumina particles in which a ZrLa mixed oxide containing Zr and La is carried on activated alumina particles, and
part of particles of the first mixed oxide particle component is attached to the ZrLa-alumina particles.

18. The exhaust gas purification catalyst of claim 3, wherein the catalyst layer includes ZrLa-alumina particles in which a ZrLa mixed oxide containing Zr and La is carried on activated alumina particles, and
part of particles of the first mixed oxide particle component is attached to the ZrLa-alumina particles.

19. The exhaust gas purification catalyst of claim 1, wherein the first mixed oxide particle component constitutes at least part of a binder in the catalyst layer.

20. The exhaust gas purification catalyst of claim 4, wherein the first mixed oxide particle component constitutes at least part of a binder in the catalyst layer.

* * * * *